United States Patent [19]

Ozawa

[11] Patent Number: 5,139,662
[45] Date of Patent: Aug. 18, 1992

[54] APPARATUS FOR CLARIFYING WATER

[76] Inventor: Masakatsu Ozawa, 188, Mizukami, Fujieda-shi, Shizuoka-ken, Japan

[21] Appl. No.: 653,088

[22] Filed: Feb. 8, 1991

[30] Foreign Application Priority Data

Feb. 9, 1990 [JP] Japan .................... 2-31188
Mar. 15, 1990 [JP] Japan .................... 2-65219

[51] Int. Cl.⁵ .............. B01D 17/035; B01D 21/24; C02F 1/24
[52] U.S. Cl. .................. 210/221.2; 210/197; 210/520; 210/525; 209/168
[58] Field of Search ............... 209/168, 170; 210/221.2, 221.1, 209, 703, 520, 525, 197

[56] References Cited

U.S. PATENT DOCUMENTS

| | | | |
|---|---|---|---|
| H458 | 4/1988 | Turner | 209/168 |
| 3,642,617 | 2/1972 | Brink | 210/221.2 |
| 3,799,350 | 3/1974 | Savall | 210/221.2 |
| 4,022,696 | 5/1977 | Krofta | |
| 4,157,952 | 6/1979 | Krofta | 210/221.2 |
| 4,184,967 | 1/1980 | Krofta | |
| 4,659,458 | 4/1987 | Chin | 209/168 |
| 4,784,764 | 11/1988 | Kleincchnittger | 210/96.1 |
| 4,931,175 | 6/1990 | Krofta | 210/221.2 |

FOREIGN PATENT DOCUMENTS

1134763 11/1968 United Kingdom ............... 209/170

*Primary Examiner*—Stanley S. Silverman
*Assistant Examiner*—Thomas M. Lithgow
*Attorney, Agent, or Firm*—Steven M. Rabin

[57] ABSTRACT

An apparatus for clarifying water. The apparatus includes a mixing chamber for mixing the water to be clarified with pressurized water and air to obtain a mixture in which particles attached to air bubbles are suspended. The mixing chamber is connected to a flotation tank which holds a body of water whose upper surface is maintained at a predetermined level. The mixture, including the particles attached to air bubbles, is delivered by a distribution pipe from an upper part of the mixing chamber onto the surface of the water in the tank so that the floatables come to a floating position on the surface without causing agitation or turbulence below the surface. A skimmer rake skims the floatables to an outlet where they are removed from the tank leaving the water at the bottom of the tank clarified.

18 Claims, 8 Drawing Sheets

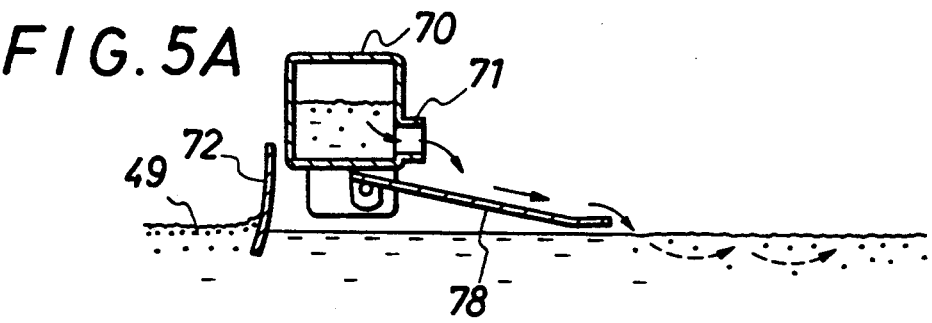
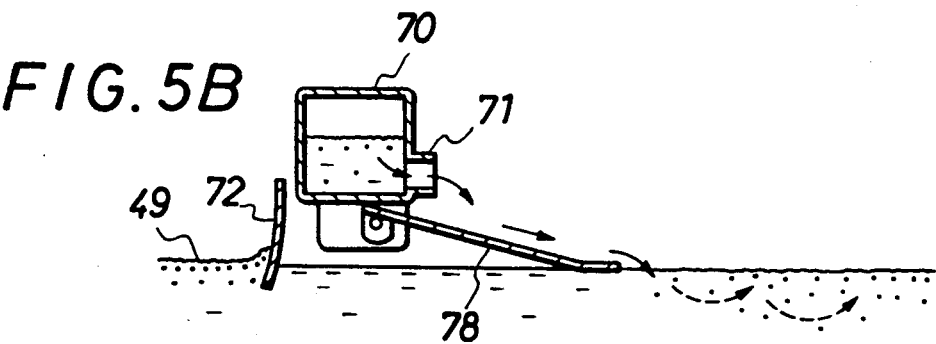
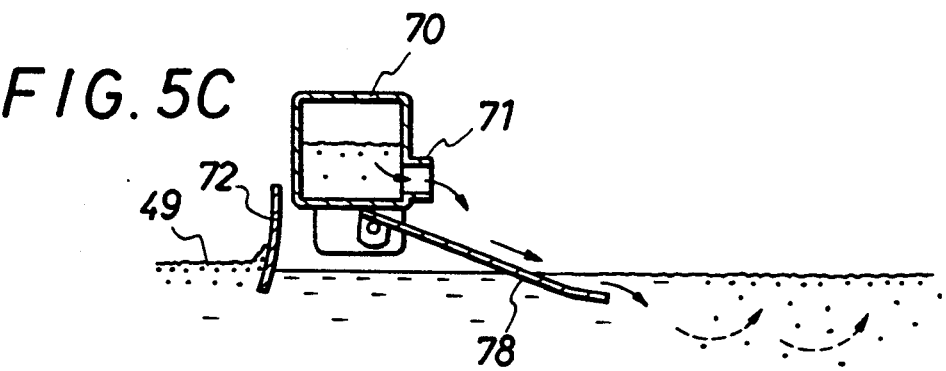
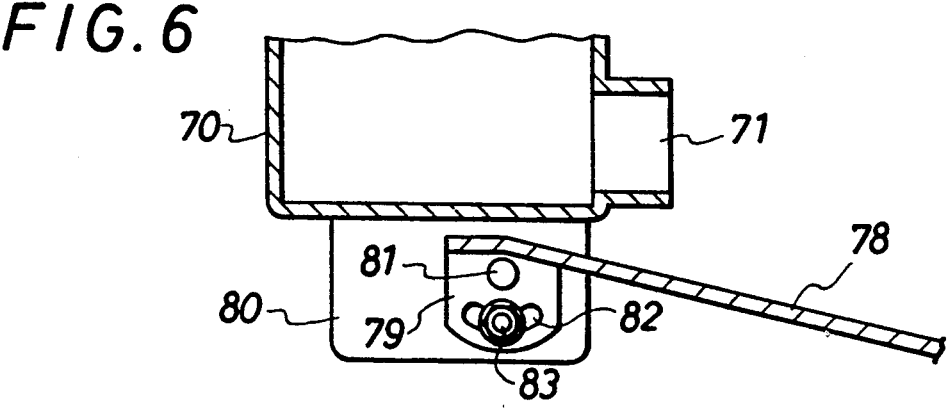

APPARATUS FOR CLARIFYING WATER

CROSS-REFERENCE TO RELATED APPLICATION

This application claims the priority of Japanese Application Serial No. 2-31188 filed Feb. 9, 1990 and Japanese Application Serial No. 2-65219 filed Mar. 15, 1990, both of which are incorporated herein by reference.

BACKGROUND OF THE INVENTION

The present invention relates to an apparatus and method for clarifying water, and more particularly, to such an apparatus and method which cause microscopic air bubbles to attach to particles in water to be clarified so that the particles float to the surface and may be easily removed.

In a known process of removing particles from unclarified water, the unclarified water is pressurized so as to dissolve air in the water, and when the pressure is released, the dissolved air emerges as microscopic air bubbles which attach to the particles and float them on the surface for recovery. Apparatuses of the prior art for performing this process are disclosed in JP(B2) P56-23668 and its U.S. counterpart, U.S. Pat. No. 4,022,696, and Japanese Patent Pub. No. 58-23153 and its U.S. counterpart, U.S. Pat. No. 4,184,967. In these apparatuses, the unclarified water is supplied to a body of water in a flotation/separation tank within which the solids are separated.

FIG. 10 shows a typical apparatus according to the prior art including a flotation tank 1. An inlet pipe 2 opens into the tank 1 to supply thereto water which has been treated in a manner as will be explained below. A catcher pipe 3 is disposed near the bottom of the tank 1 for the discharge of clarified water. A holding tank 4 for the clarified water houses a water level pipe 5 which is connected to the catcher pipe 3. The level of the water in the pipe 5 determines the water level in the flotation tank 1.

A further tank 6 containing the original water to be clarified is connected by a pump 9 to a mixer 7. A pressurizing tank 8 holding pressurized water is connected to the mixer 7 and is connected via a pump 10 to the holding tank 4. The mixer 7 is connected to the inlet pipe 2. An air intake 11 is provided for introducing the air to the pressurizing tank 8.

A conventional skimmer rake 12 for skimming floating particles (floatables) from the surface of the water in the tank 1 is connected to the drive shaft of a motor 13. The motor 13 is mounted above the center of the tank and rotates the skimmer rake along the water's top surface. An outlet 14 is provided in the upper part of the tank 1 to discharge the particles skimmed by the skimmer rake. A second rake 15 is provided to rake sediments at the bottom of the tank 1 to an outlet 16.

In the above-described apparatus, the unclarified water to be processed, which is stored in the tank 6, is supplied by the pump 9 to the mixer 7. At the same time, a portion of the clarified water in the tank 4 is supplied by the pump 10 to the pressurizing tank 8, where the water is pressurized together with the air taken in through the intake 11, and then supplied to the mixer 7. The unclarified water reaching the mixer 7 is mixed with the pressurized water, and the mixture is fed in a pressurized condition to the inlet pipe 2.

The pressure in the tank 1 is at an atmospheric level. Thus, when the pressurized mixed water is released from the pipe 2 into the tank 1, the air dissolved in the mixed water separates from the water as microscopic air bubbles which attach themselves to the particles in the water, and the bubbles together with the attached particles float to the surface.

The particles floating on the surface in the tank 1 are skimmed off by the skimmer rake 12 which directs the particles to the outlet 14 for discharge. The remaining water in the tank 1, which is now clarified, is supplied to the tank 4 by the catcher pipe 3, from where the water is partly discharged and partly recycled to the tank 1 via the pressurizing tank 8 and the mixer 7 as described above.

In prior art water clarifying processes wherein unclarified water and pressurized water are supplied to a body of water in a tank in order that particles from the unclarified water may float to the surface and be removed, subsurface turbulence is created. Because the removal of the particles requires that they first attach themselves to microscopic bubbles to float them upward, the turbulence causes the attached bubbles and particles to firstly move downward near the bottom of the tank and then move upward to the surface. Thus, the turbulence increases the period of time required for all of the particles to float to the surface. As a result, in order to efficiently clarify a large quantity of unclarified water, a large, wide (and therefore expensive) flotation tank is required.

SUMMARY OF THE INVENTION

An object of the present invention is to provide a water clarifying apparatus with enhanced processing capacity. Another object of the invention is to provide a water clarifying apparatus and method in which the water to be clarified is directed from above onto the surface of a body of water in a flotation tank so as to prevent turbulence in the body of water in the tank. Still another object of the present invention is to provide a water clarifying apparatus where water can be supplied onto the surface at an angle appropriate to the properties of the water. A still further object of the invention is to provide a water clarifying apparatus which includes an improved guide plate for guiding water into a flotation tank, wherein the angle of the guide plate with respect to the surface of the water in the tank can be adjusted.

To achieve the above objects, the apparatus according to the present invention includes a mixing chamber in which water to be clarified is mixed with pressurized water and air to obtain mixed water containing suspended particles attached to air bubbles. The mixing chamber is connected to a flotation tank which holds a body of water whose upper surface is maintained at a predetermined level. The mixing chamber and the interior of the flotation tank are at atmospheric pressure. The mixed water, including the suspended particles attached to air bubbles, is delivered by a distribution pipe from an upper part of the mixing chamber onto the surface of the water in the tank without causing turbulence in the water. In this way, the suspended particles will rise to a floating position on the surface rapidly and without being agitated. A skimmer rake skims the floatables to an outlet where the particles are removed from the tank, leaving the water at the bottom of the tank clarified. To achieve the objects of the invention, the present invention may further include a means for adjusting an angle of delivery of the mixed water onto the surface, which in the preferred embodiment is an adjustable guide plate.

In the present invention with the above structure, and according to a preferred embodiment thereof, the unclarified water and the pressurized water are introduced to the bottom of the mixing chamber and mixed therein, and because the mixing chamber is at atmospheric pressure, the mixed water flows gradually upward due to the inflow of mixed water from the bottom while producing microscopic air bubbles. The air bubbles attach themselves to the particles which are suspended in the mixed water and flow via the distribution pipe from the upper part of the mixing chamber onto the surface in the tank. Because the particles are attached to air bubbles, they have reduced specific gravity and therefore float on the surface. The floatables are skimmed by the skimmer rake and directed to an outlet. According to a further aspect of the invention, the outlet includes an absorption cup operated by a discharge pump which draws the skimmed particles out of the tank.

According to the method of the invention, a body of water in a flotation tank is maintained at a predetermined level, water to be clarified is mixed with pressurized water and air in a mixing chamber to obtain mixed water having particles attached to air bubbles suspended therein, the mixed water, including the particles attached to air bubbles, are delivered from the mixing chamber onto the upper surface of the body of water so that the particles attached to air bubbles float on the upper surface, and the floating particles from the upper surface so as to clarify the water in the tank.

By delivering the mixed water onto the surface of the water in the tank according to the present invention, no subsurface turbulence is caused in the tank. As a result, the particles settle on the surface of the body of water relatively quickly so that the total time that the particles in the tank are below the top surface surface of the water can be reduced. This improves the efficiency of separation of the particles from the water in the tank and permits the use of a tank which provides a smaller surface area and depth for the water therein. Further, the present invention reduces the time of retention of unclarified water in the tank, thereby remarkably increasing the quantity of water that can be processed per unit volume of the tank. Further, the provision of a guide plate which is adjustable in its angle relative to the top surface of the water allows the angle at which the mixed water is delivered to be adjusted as desired. Moreover, by adjusting the angle of the guide plate, the mixed water may be delivered somewhat at a distance from the surface or at a position abutting on the surface.

BRIEF DESCRIPTION OF THE DRAWINGS

These and other features and advantages of the invention will be further understood from the following detailed description of the preferred embodiments with reference to the accompanying drawings in which:

FIGS. 5A, 5B and 5C are sectional views showing a distribution pipe and guide plate in detail, according to the second embodiment;

FIG. 6 is an enlarged sectional view showing the adjustably mounted guide plate of FIGS. 5A, 5B and 5C;

DETAILED DESCRIPTION OF THE PREFERRED EMBODIMENTS

Figure 1:
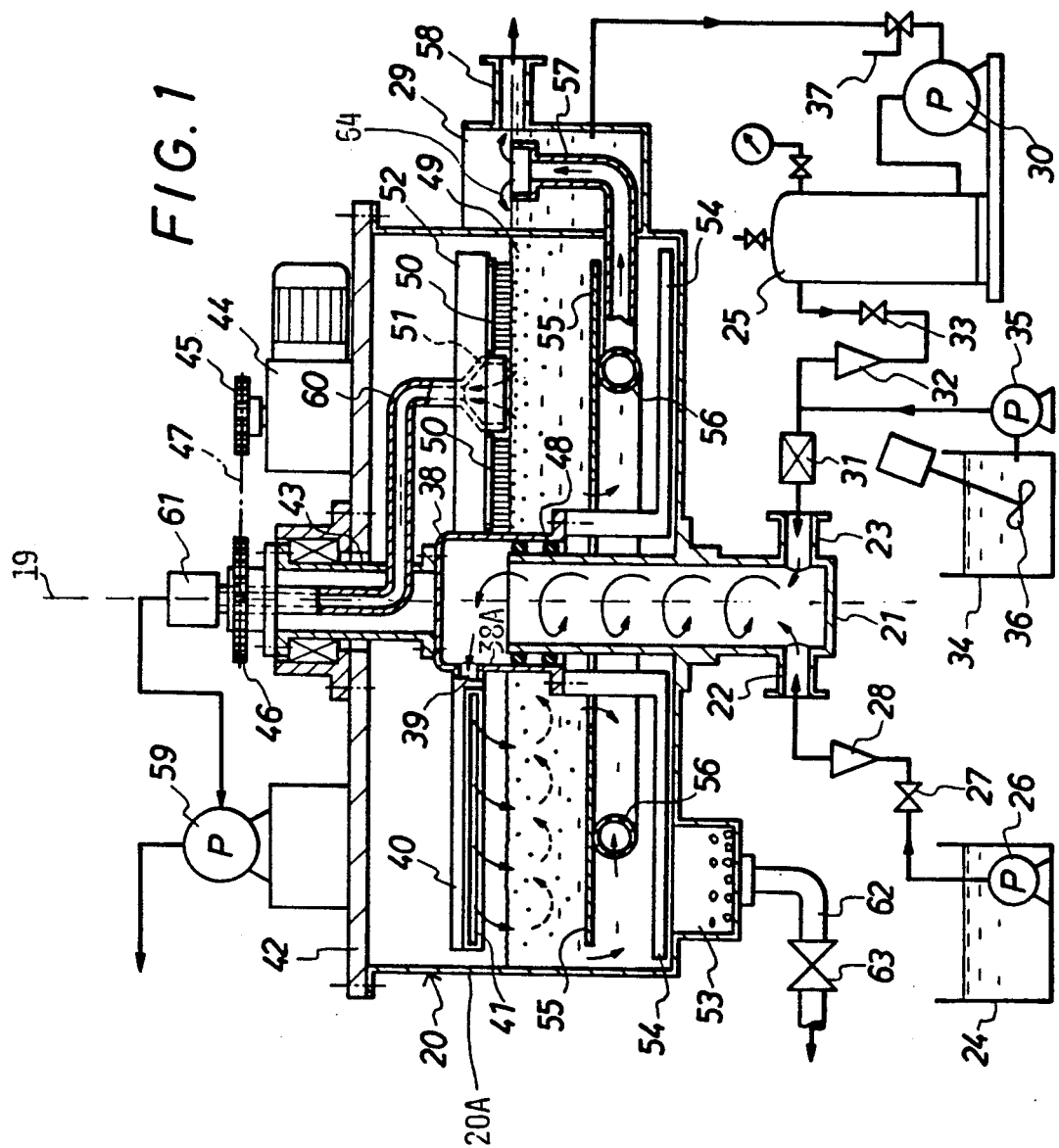
FIG. 1 is a partially schematic, elevational sectional view of the apparatus according to a first embodiment of the invention.
Figure 2:
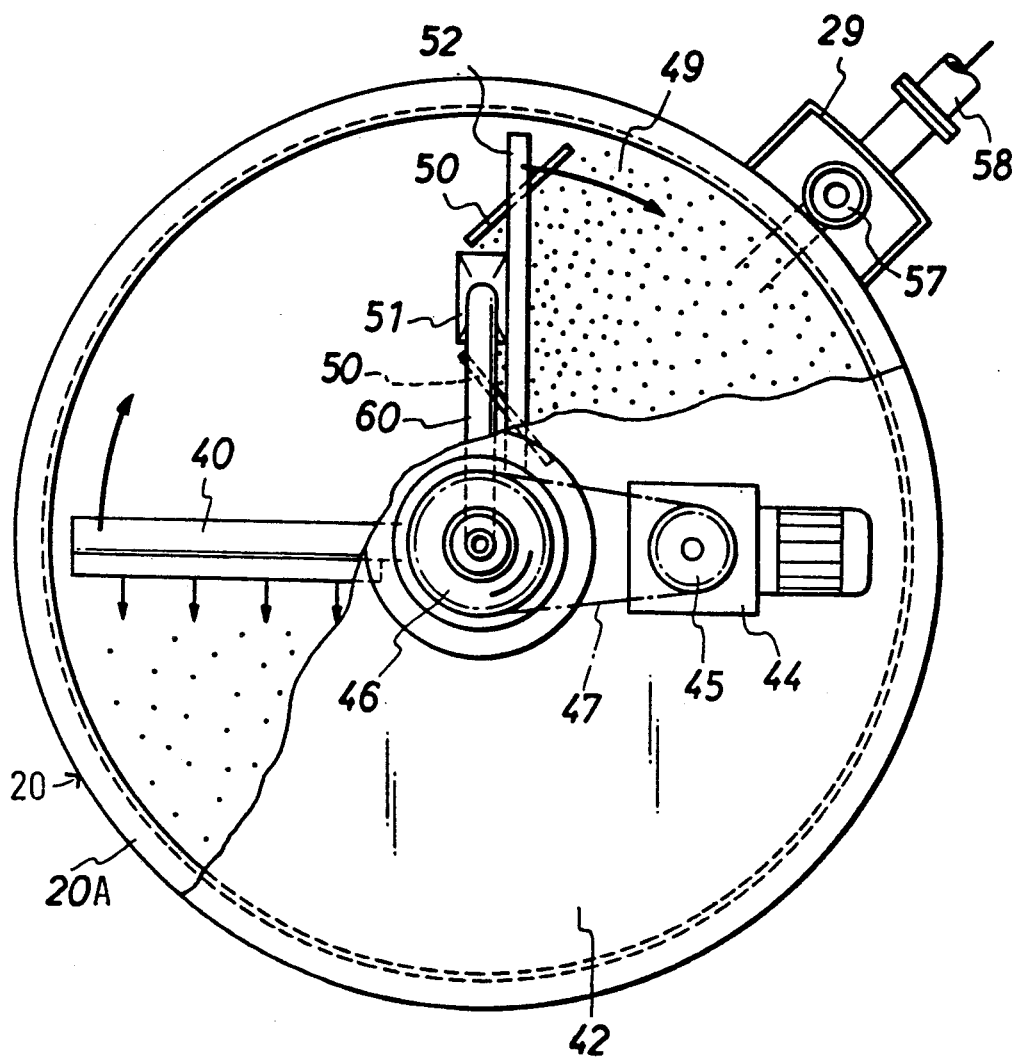
FIG. 2 is a top view of the apparatus of FIG. 1.
Figure 3:
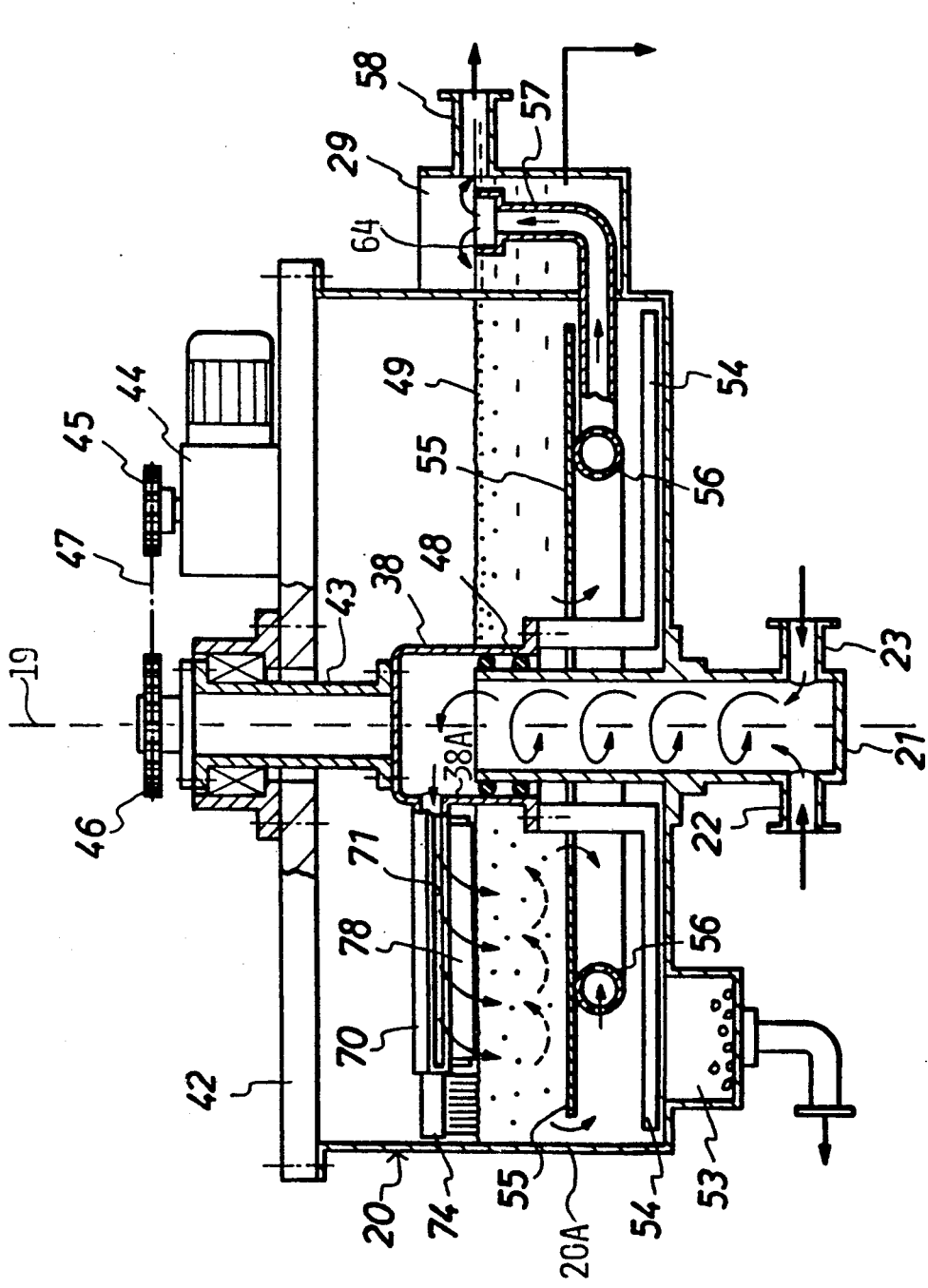
FIG. 3 is a partial elevational sectional view of the apparatus according to a second embodiment of the invention.

Referring to FIGS. 1 and 2, a first embodiment of the invention includes a cylindrical flotation tank 20 having a cylindrical sidewall 20A and a center axis 19. In use, the tank 20 contains a body of water having a circular upper surface. Positioned in the tank 20 so as to be centered on the axis 19 is a cylindrical mixing chamber 21 having two inlets at its bottom end, including an inlet 22 for the unclarified water to be processed (clarified) and another inlet 23 for pressurized water. The interiors of both the flotation tank 20 and the mixing chamber 21 are maintained at atmospheric pressure. Thus, the unclarified water stored in the tank 24 and the pressurized water in the tank 25 are supplied separately to the bottom of the mixing chamber 21. The inlet 22 is connected to a tank 24 for temporary storage of unclarified water to be processed and the inlet 23 is connected to a pressurizing tank 25. The tank 24 is connected to the inlet 22 via a pump 26, a flow adjusting valve 27, and a flow meter 28.

Outside of the flotation tank 20, there is a water tank 29 which provides temporary storage of clarified water and from which a portion of the clarified water is removed to be pressurized with air by a pump 30 and stored in the tank 25. An air intake 37 is provided between the tank 29 and the pump 30 for adjustment of the flow of the clarified water into the tank 25. Between the inlet 23 and the tank 25, a pressure reducing valve 31, a flow meter 32 and a flow adjusting valve 33 are provided in series. Further, a tank 34 for chemical agents such as flocculating agents is connected by a supply pump 35 to the input side of the pressure reducing valve 31 in parallel with the series connected flow meter 32, flow adjusting valve 33 and tank 25. A stirring means 36 is provided in the tank 34 for stirring the chemical agents.

A cylindrical cup-shaped member 38 having a cylindrical sidewall 38A is rotatably mounted over the upper end of the mixing chamber 21. Between the mixing chamber 21 and the rotatable member 38, there is provided an appropriate seal 48 which permits the member 38 to rotate thereon while preventing water from leaking between the member 38 and the mixing chamber 21. The rotatable member 38 has an outlet 39 in the sidewall 38A. A horizontal distribution pipe 40 is connected to the outlet 39 so as to extend radially outwardly with respect to the axis 19. The distribution pipe 40 has a distribution slit 41 opening along the length the pipe. The water to be processed, namely the mixture of the unclarified water to be processed and the pressurized water, passes from the mixing chamber 21 through the outlet 39 into the pipe 40 from which it is distributed onto the surface of the body of water in the tank 20 via the slit 41.

A rotatable shaft 43, projecting vertically through a frame 42 covering the upper part of the flotation tank 20, is mounted to the member 38. A driver gear 46 is mounted at an upper end of the drive shaft 43. A rotational drive such as a motor 44 is mounted on the frame 42 and has a driving gear 45 coupled by a gear chain 47 to the driven gear 46.

Inside the tank 20, a pair of horizontally extending skimmer rakes 50 and an absorption cup 51 are provided. The skimmer rakes 50 are mounted to a mounting bar 52 which is fixed to the member 38. Thus, rotation of the member 38 also rotates the skimmer rakes 50. The rakes 50 are angled toward each other relative to the radial direction on opposite sides of the absorption cup 51 so that when the rakes are rotated, floating particles (floatables) on the surface of the water in the tank 20 are skimmed off and gathered at the cup 51. The cup 51 is connected to one end of an absorption pipe 60. The other end of the pipe 60 is connected via a universal joint 61 to a pump 59 which is mounted on the frame 42 so that the floatables gathered at the cup 51 are drawn by the pump out of the tank 20 via the cup 51 and the pipe 60.

Rakes 54 are provided at the bottom of the tank 20 for raking sediments on the bottom toward an outlet 53. The outlet 53 is connected to a discharge pipe 62, which is opened and closed by a valve 63 and is usually closed. The rakes 54 extend radially outwardly of the mixing chamber 21 and are connected to the cylinder 38 to be rotated thereby.

Partition plates 55 are mounted near the bottom of the tank 20. Beneath the plates 55, a water catcher pipe 56 is provided. The water catcher pipe 56 is connected to a gauge pipe 57 which passes through a wall of the tank 20 into the clarified water tank 29 where it bends upward to an open end 64. The clarified water enters the tank 29 from the bottom of the tank 20 through the pipes 56 and 57. By this arrangement, the water level in the tank 20 is determined by the height of the gauge pipe 57 in the tank 29. Water is discharged from the tank 29 through a discharge pipe 58 formed in an outer wall thereof.

As shown in FIG. 2, the distribution pipe 40, the skimmer rakes 50 and the absorption cup 51 are adapted to be rotated clockwise by the motor 44. The distribution pipe 40 is followed in the rotational direction by the skimmer rakes 50 and the absorption cup 51. The skimmer rakes 50 are angled relative to the radial direction so that they rake the floatables 49 toward the absorption cup 51.

In the above-described apparatus, the clarified water from the tank 29 is pressurized to, for example, 2 to 4 kg/cm² by a pump 30 with air whose weight ratio to the particles in the unclarified water to be processed is about 1/10 to 1/50; then the water is supplied to the tank 25. Consequently, a large amount of air is dissolved in the water in the tank 25.

In the illustrated embodiment, the air is introduced to the intake side of the pump 30 and pressurized together with the water to be processed, so as to eliminate the requirement for an air compressor. Alternatively, it may be possible to separately pressurize the unclarified water and air and supply them to the tank 25.

The flow of water from the tank 25 is controlled by the flow adjusting valve 33, and is supplied through the pressure reducing valve 31 and the inlet 23 to the bottom of the mixing chamber 21, together with chemical agent fed from the tank 34 via the pump 35. The flow of unclarified water to be processed from the tank 24 is controlled by the pump 26 and the flow adjusting valve 27, and is fed through the inlet 22 to the bottom of the mixing chamber 21, where the unclarified water is mixed with the pressurized water and gradually rises.

Since the mixing chamber is at atmospheric pressure, the air dissolved in the pressurized water supplied from the inlet 23 emerges as microscopic air bubbles and the bubbles attach to the particles contained in the water. The mixed water, including the unclarified water and the particles and attached air bubbles, reaches the upper end of the mixing chamber 21 and flows out from the outlet 39 in the cup-shaped member 38 and into the clockwise-rotating distribution pipe 40. Then the water is uniformly distributed onto the water surface in the tank 20 from the slit 41 formed in the rotating distribution pipe 40.

Due to the low specific gravity of bubbles to which the particles become attached, the particles are separated from the water and float to the surface of the water in the tank 20. The skimmer rakes 50 rotating with the distribution pipe 40 rake or skim off the floatables and carry them to the absorption cup 51 to be absorbed and discharged thereby.

On the other hand, particles having larger specific gravity than water sink to become sediment at the bottom of the tank 20, where they are raked by the rakes 54 and carried to the outlet 53. Consequently, only water which is free of floating particles and sediments flows through the catcher pipe 56 and the gauge pipe 57 into the tank 29. As aforementioned, a portion of the processed water in the tank 29 is pressurized by the pump 30 and re-cycled to the flotation tank while the remaining processed water is discharged through the discharge pipe 58.

In this embodiment, air bubbles attach to the solid particles in the mixing chamber 21 which is substantially separated from the flotation tank 20 and the water containing the particles with attached air bubbles is delivered from the top of the mixing chamber 21 directly onto the surface of the water in the tank 20. Therefore, the flow of mixed water into the tank 20 does not cause subsurface turbulence or agitation of the water, as seen in the prior art, but only a sinking phenomenon in which the air bubbles sink only to a very small extent. Thus, the required depth of the water in the flotation tank 20 is limited to that necessary to allow for such sinking, and the required surface area can be determined without the need to consider effects of turbulence.

As an example, the processed water is re-cycled at a rate of 2 m³ per hour in a flotation tank whose water surface area is one square meter, and the unclarified water to be processed is supplied to the mixing chamber at a rate of 5 m³ per hour for a total volumetric pass-through of the flotation tank of 7 m³ per hour. In this case, the air bubbles sink to a maximum depth of 30 cm. So, even with a safety factor of 2, the effective water depth for the flotation tank can be 60 cm. The water depth is related to the retention time of the supplied water in the flotation tank by the following equation:

$$\text{water depth} = \frac{\text{retention time (Hrs.)} \times \text{supplied water flow rate (m}^3 \text{ per Hr.)}}{\text{surface area of water in tank (m}^2)} \quad (1)$$

From the above equation, the required retention time for processing is calculated by the following equation:

$$\text{Retention time (Hrs.)} = \frac{\text{water depth} \times \text{supplied water flow rate (m}^3 \text{ per Hr.)}}{\text{surface area of water in tank (m}^2\text{)}} \quad (2)$$

$$= \frac{0.6}{7} = 0.09 \text{ hrs.} = 5 \text{ min.}$$

In other words, it is possible in an apparatus according to the invention to process water at a rate of 7 m³ per hour if the flotation tank has a water surface area of 1 m², an effective water depth of 0.6 m, and a retention time of 5 minutes. Comparing this to a prior art tank having the same processing capacity, the flotation tank of the present invention can have a water depth which is ¼ to 1/5 of that required in the prior art, thereby substantially reducing the size of the flotation tank.

In the embodiment of FIGS. 1 and 2, the skimmer rakes 50 and the absorption cup 51 are disposed about 270 degrees behind the distribution pipe 40. However, in order to extend the time lag between the distribution of the water and the removal of the floatables, and thereby to correspondingly increase the processing capacity of the apparatus as measured by the supplied water flow rate (see equation (1)), this angle may be enlarged up to, for example, 315 or 340 degrees.

A second embodiment of the invention is shown in FIGS. 3 to 6 in which like elements to those in the first embodiment are referenced with like numerals, and their detailed description is omitted for the sake of brevity. In the second embodiment a horizontal distribution pipe 70 is connected to the outlet 39 so as to extend radially outwardly with respect to the axis 19. The distribution pipe 70 has on one side thereof a distribution slit 71 opening along the length the pipe. Through the slit 71 the mixed water to be processed coming from the mixing chamber 21 is distributed from above onto the surface in the flotation tank 20. At a side of the pipe 70 opposite the distribution slit 71, the pipe 70 carries via legs 73 a second skimmer rake 72 for skimming off the floatables on the surface. The skimmer rake 72 is angled to the distribution pipe 70, and as the pipe 70 rotates in the tank 20, the skimmer rake 72 pushes the floatables toward the circumferential wall of the tank 20.

The distribution pipe has at its tip a radially extending discharge rake 74 which is adapted to rake the floatables 49 gathering at the circumferential wall into an outlet 75 in the circumferential wall 20A. The flotation tank 20 has a discharge chamber 76, at the outlet 75, from which the floatables are drawn to a discharge pipe 77.

FIGS. 5A, 5B, 5C and 6 show in detail a guide plate 78 mounted to the distribution pipe 70. Brackets 80 are fixed at opposite lower ends of the pipe 70. The guide plate 78 is mounted near the distribution slit 71 and has a pair of mounting plates 79 at opposite ends, each rotatably mounted by a pin 81 to a respective bracket 80. Each mounting plate 79 has a circularly arched opening 82, through which a respective bolt 83 is provided to fix the guide plate 78 to the bracket 80. Thus, the guide plate 78 is adjusted in the angle which it takes with respect to the surface of the water by the position in the openings 82 that the bolts 83 are fixed. Three such positions are respectively illustrated in FIGS. 5A, 5B and 5C: a first position in which the tip of the guide plate is somewhat spaced above the surface of the water in the tank 20 (FIG. 5A), a second position in which the tip abuts on the surface (FIG. 5B), and a third position in which the tip is in the water but very near to the surface (FIG. 5C)

Figure 4:
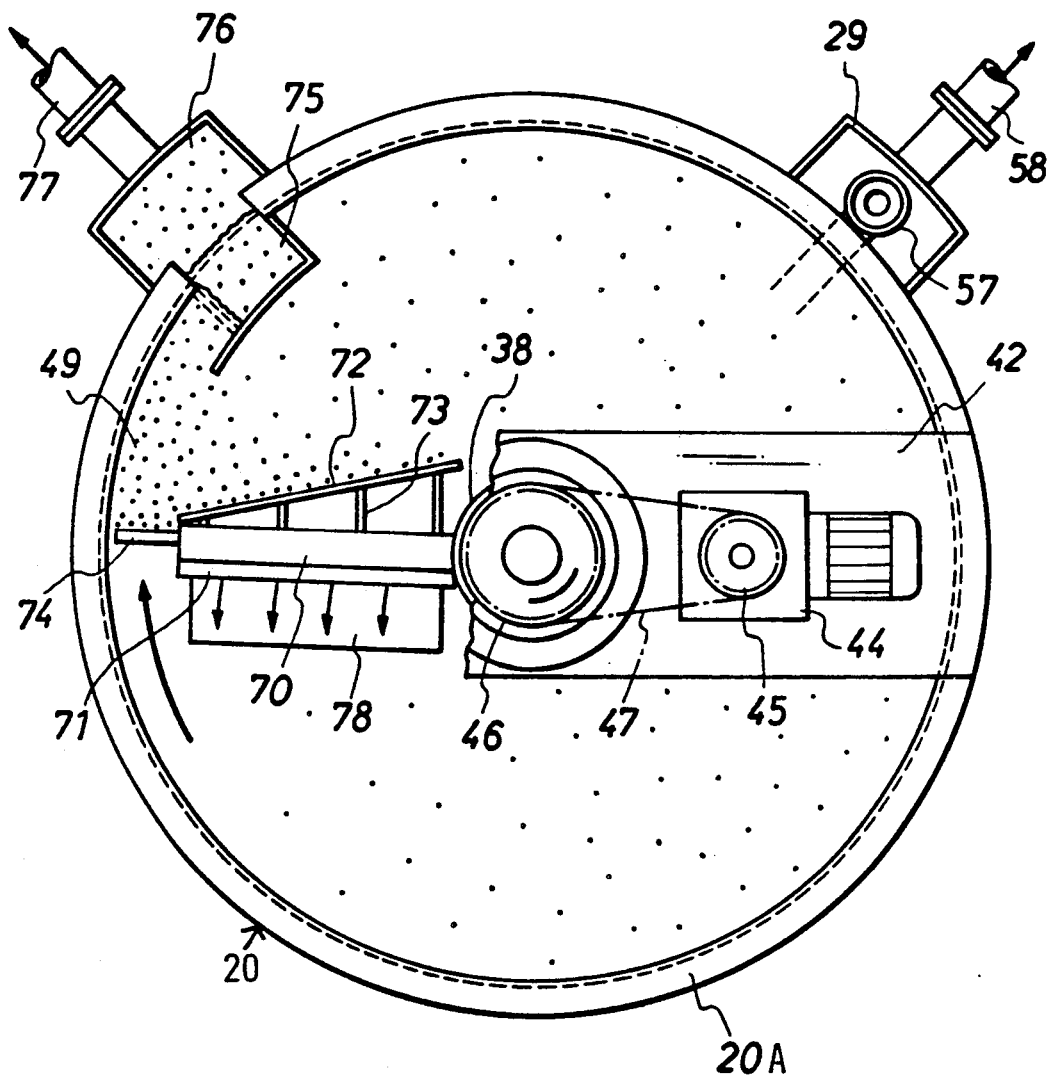
FIG. 4 is a top view of the apparatus of FIG. 3.
Figure 7:
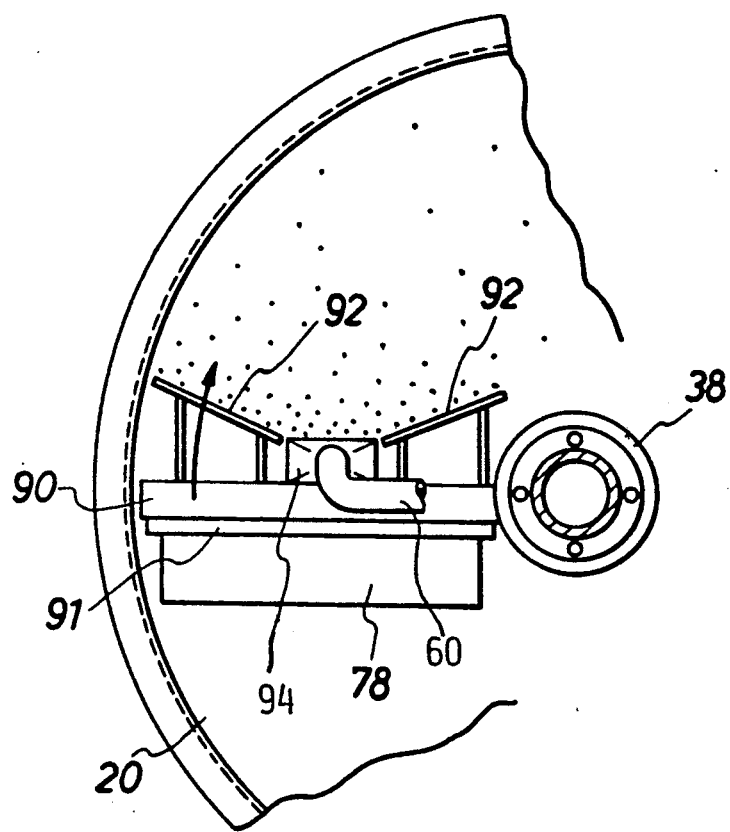
FIG. 7 is a fragmentary top view of an alternate arrangement for removing floating particles according to the invention.

FIG. 7 illustrates a modification of the embodiment of FIG. 4 in which an alternative device for removing floatables from the tank is provided. The device includes a distribution pipe 90 having a distribution slit 91, and skimmer rakes 92 angled to skim the floatables toward an absorption cup 94. The skimmer rakes 92, like the skimmer rake 72 of the embodiment of FIG. 4, is fixed by legs to a side of the distribution pipe which is opposite to the distribution slit. As in the case of the first embodiment, the absorption cup 94 is connected to a pump so as to absorb and discharge the floatables.

Each of the above-described embodiments includes a single distribution pipe projecting in one direction from the mixing chamber 21. If the flotation tank has a large water capacity and a greater processing speed is desired, another distribution pipe may be mounted at an angle about the axis 19 of 180 degrees from the first. In this case, the processing capacity is increased.

Figure 8:
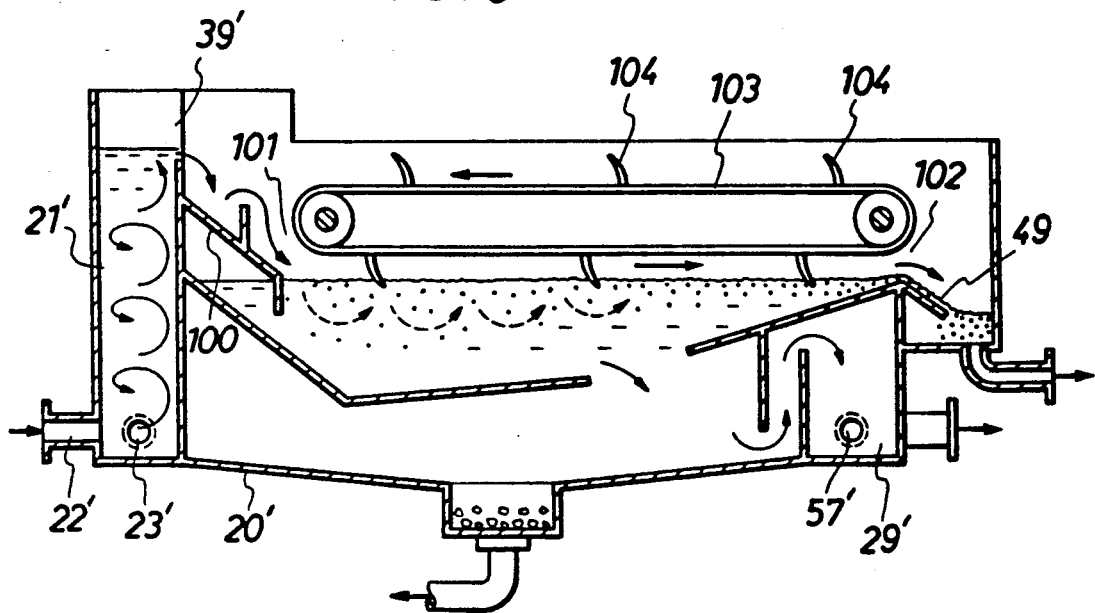
FIG. 8 is a partial elevational sectional view of the apparatus according to a third embodiment of the invention.
Figure 9:
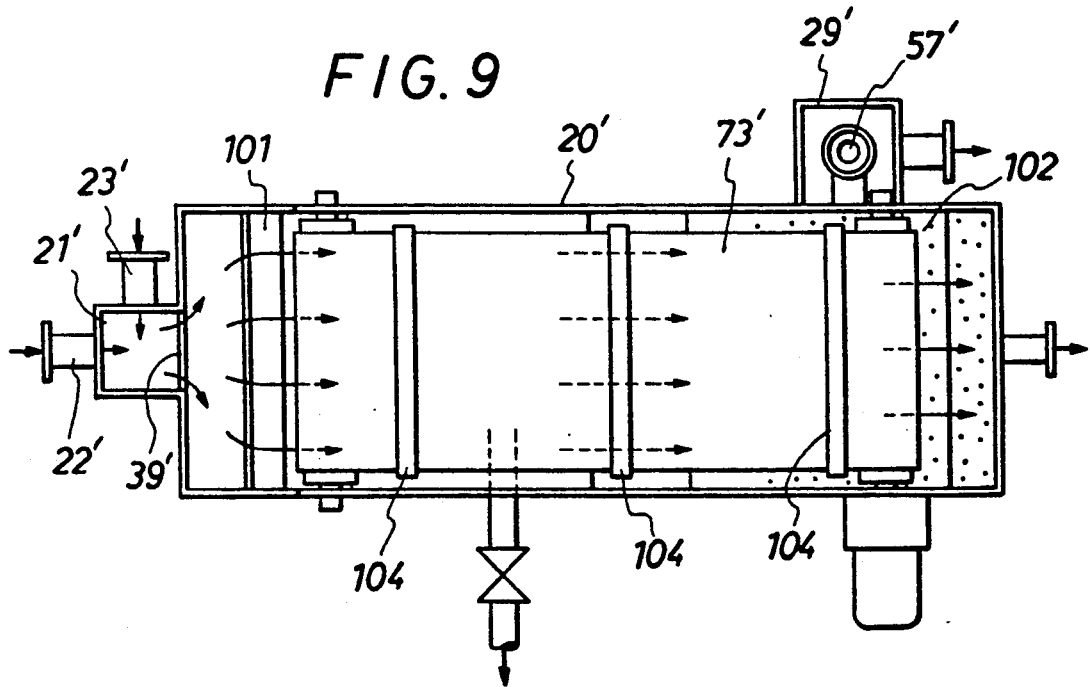
FIG. 9 is a top view of the apparatus of FIG. 8.
Figure 10:
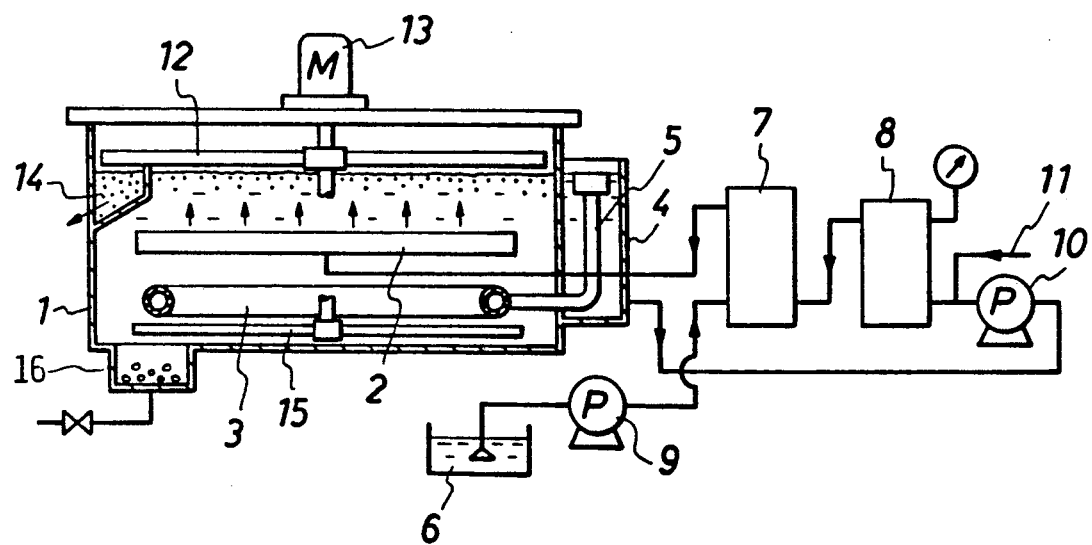
FIG. 10 shows an apparatus for clarifying water according to the prior art.

A third embodiment of the invention in which the flotation tank has a quadrangle shape is shown in FIGS. 8 and 9. In this embodiment, the parts having the same function as those of the first embodiment, but with a somewhat different shape, are indicated by the same reference numerals with a prime (') and their detailed description in some cases is omitted for the sake of brevity.

The flotation tank 20', having a rectangular shape in horizontal cross section, is provided at one side with a mixing chamber 21' having an outlet 39' in its upper part. The water to be processed coming from the outlet 39' flows along a guide plate 100 onto the surface of the water in the tank 20'. The tank 20' has an inlet opening 101 for the water at the one side. The opening 101 is contiguous to the guide plate 100. An outlet 102 for floatables is provided at the opposite side of the tank. Between the inlet 101 and the outlet 102 is disposed a conveyor 103 formed as an endless belt and having skimmer rakes 104 thereon. By this arrangement, the skimmer rakes 104 are are able to skim off the floatables 49 on the surface in the body of water in the tank 20' and carry them to the outlet 102.

It will be understood that the above description of the present invention is susceptible to various modifications, changes and adaptations, and the same are intended to be comprehended within the meaning and range of equivalents of the appended claims.

What is claimed is:

1. An apparatus for clarifying water by removing particles therefrom, comprising:
    a flotation tank for holding a body of water, the body of water having an upper surface;
    means for maintaining the upper surface of the body water at a predetermined level in said tank, said tank having a circular horizontal cross section at said predetermined level so that the upper surface of the body of water is circular, said tank having a vertical axis extending through a center of said cross section;
    a mixing chamber means, said mixing chamber means having receiving means for receiving pressurized water, pressurized air, and particle containing water to be clarified, said mixing chamber means mixing the water to be clarified with the pressurized water and pressurized air to obtain mixed water having particles attached to air bubbles suspended therein, said mixing chamber means having a lower part below said predetermined level and an upper part above said lower part, at least said upper part substantially along said axis;

means for delivering the mixed water, including the particles attached to air bubbles, from said upper part of said mixing chamber means onto the upper surface of the body of water so that the particles attached to air bubbles float on said upper surface, said means for delivering the mixed water including a distribution pipe mounted to said upper part of said mixing chamber means for rotation about said axis, said distribution pipe extending from said upper part in a first horizontal direction to distribute the mixed water over said upper surface as said distribution pipe rotates, said first horizontal direction being a first radial direction with respect to said axis, said distribution pipe having a distribution slit in one side thereof extending in said first horizontal direction;

means for removing the floating particles from said upper surface so as to clarify the water in said tank, said means for removing the floating particles including a skimmer rake means, said skimmer rake means being mounted to said upper part for rotation about said axis, said skimmer rake means extending from said mixing chamber means in a second horizontal direction to rake the floating particles form said upper surface as said skimmer rake mans rotates, and means, mounted adjacent to said skimmer rake means for rotation therewith on a side of said distribution pipe opposite to said one side, for receiving and carrying away the floating particles raked by said skimmer rake means; and means for rotating said distribution pipe, said skimmer rake means and said means for receiving and carrying away the floating particles, about said axis.

2. Apparatus as claimed in claim 1, wherein the means for delivering delivers the mixed water to the upper surface of the water at an angle to said upper surface.

3. Apparatus as claimed in claim 2, wherein said means for delivering the mixed water includes means for adjusting said angle.

4. Apparatus according to claim 1, wherein said mixing chamber means is cylindrical.

5. Apparatus as claimed in claim 1, wherein said rotating means includes a member mounted on said upper part, said member being rotatable about said axis, said distribution pipe and said skimmer rake means being mounted to said member for rotation therewith, and means for rotating said member, and said distribution pipe and said skimmer rake means therewith, about said axis.

6. Apparatus as claimed in claim 5, wherein said member is cup-shaped and covers said upper part of said mixing chamber means, said member having a cylindrical wall, said wall having an opening, said slit in said distribution pipe communicating with said mixing chamber means through said opening.

7. Apparatus as claimed in claim 1, further comprising a member mounted on said upper part, said member being rotatable about said axis, a mounting bar fixed to said member, said skimmer rake means being mounted to said bar and being angled to a second radial direction with respect to said axis so as to skim off the floating particles toward said means for receiving and carrying away the floating particles.

8. Apparatus as claimed in claim 1 wherein said receiving means is formed in said bottom part of said mixing chamber means, further comprising means for supplying the pressurized water, with the air dissolved therein, into said bottom part through said receiving means, and said tank is exposed to an external atmosphere.

9. Apparatus as claimed in claim 1, further comprising means for removing clarified water from a bottom portion of said tank;

means for pressurizing a portion of the removed clarified water to obtain the pressurized water, and means for supplying the pressurized water to said receiving means.

10. Apparatus as claimed in claim 1, wherein said tank is an open tank.

11. An apparatus for clarifying water by removing particles therefrom, comprising:

a flotation tank for holding a body of water, the body of water having an upper surface;

means for maintaining the upper surface of the body water at a predetermined level in said tank, said tank having a circular horizontal cross section at said predetermined level so that the upper surface of the body of water is circular, said tank having a vertical axis extending through a center of said cross section;

a mixing chamber means, said mixing chamber means having means for receiving pressurized water, pressurized air, and particle containing water to be clarified, said mixing chamber means mixing the water to be clarified, said mixing pressurized water and pressurized air to obtain mixed water having particles attached to air bubbles suspended therein, said mixing chamber means having a lower part below said predetermined level and an upper part above said lower part, at least said supper part substantially along said axis;

means for delivering the mixed water, including the particles attached to air bubbles, from said upper part of said mixing chamber onto the upper surface of the body of water so that the particles attached to air bubbles float on said upper surface, said mans for delivering the mixed water including a distribution pipe mounted to said upper part for rotation about said axis, said distribution pipe extending from said upper part in a first horizontal direction to distribute the mixed water over said upper surface as said distribution pipe rotates, said first horizontal direction being a radial direction with respect to said axis, said distribution pipe having a distribution slit in one side thereof extending in said first horizontal direction, a guide plate mounted with said distribution pipe, below said slit for guiding the mixed water from said slit onto said upper surface, said guide plate forming an angle with respect to said upper surface, and means for adjusting the angle;

means for removing the floating particles from said upper surface so as to clarify the water in said tank, said means for removing the floating particles including a skimmer rake means, said skimmer rake means being mounted to said upper part for rotation about said axis, said skimmer rake means extending from said mixing chamber in a second horizontal direction to rake the floating particles from said upper surface as said skimmer rake means rotates; and means for rotating said distribution pipe and said skimmer rake means about said axis, said rotating means including
- a member mounted on said upper part so as to be rotatable about said axis, said distribution pipe being mounted to said member for rotation therewith, and
- means for rotating said member, and said distribution pipe therewith, about said axis.

12. Apparatus as claimed in claim 11, wherein said tank has a cylindrical sidewall and said skimmer rake means rakes the floating particles to said sidewall, said means for removing the floating particles further including an outlet provided in said sidewall of said tank to discharge the floating particles.

13. Apparatus according to claim 12, wherein said means for removing the floating particles further includes a discharge rake means mounted to a tip of said distribution pipe to rake the particles at said sidewall into said outlet.

14. Apparatus as claimed in claim 13, wherein said skimmer rake means is mounted to said member for rotation therewith.

15. Apparatus as claimed in claim 11, wherein said means for removing the floating particles includes means, mounted adjacent to said skimmer rake means and rotatable therewith, for receiving and carrying away the floating particles raked by said skimmer rake means.

16. Apparatus as claimed in claim 15, wherein said skimmer rake means is mounted to said member for rotation therewith.

17. Apparatus as claimed in claim 15, wherein said means for receiving and carrying away the floating particles is mounted on a side of said distribution pipe opposite to said one side.

18. Apparatus as claimed in claim 11, wherein said rotating means rotates said skimmer rake means and said distribution pipe about said axis with said skimmer rake means angularly spaced behind said distribution pipe by an angle of more than 270 degrees.

* * * * *